United States Patent
Wright

[15] 3,658,074
[45] Apr. 25, 1972

[54] HEADLIGHT WASHER APPARATUS

[72] Inventor: Thomas Charles Wright, Chicago, Ill.
[73] Assignee: Wright Products, Inc., Chicago Ridge, Ill.
[22] Filed: July 16, 1969
[21] Appl. No.: 858,225

[52] U.S. Cl. ............................................. 134/94, 134/123
[51] Int. Cl. ....................................................... B08b 3/00
[58] Field of Search ..................... 134/94, 123, 45; 239/284

[56] References Cited

UNITED STATES PATENTS

| | | | |
|---|---|---|---|
| 3,058,142 | 10/1962 | Pollock | 15/250.02 |
| 3,117,727 | 1/1964 | Pollock et al. | 239/284 X |
| 3,127,116 | 3/1964 | Pollock et al. | 239/284 X |
| 3,295,004 | 12/1966 | Hirsch | 239/284 X |
| 3,469,088 | 9/1969 | Coleman et al. | 134/123 X |
| 3,493,804 | 2/1970 | Fennell | 15/250.01 X |

*Primary Examiner*—Marvin A. Champion
*Assistant Examiner*—Richard E. Favreau
*Attorney*—Bernard L. Kleinke

[57] ABSTRACT

A headlight washer apparatus and system for use in conjunction with, in the preferred from, automobiles having windshield washer systems. The apparatus of the invention, in one embodiment, is intended to replace the headlight retaining ring assembly presently used in most automobiles and in another embodiment is adapted to be used in conjunction with the retaining ring assembly. Both types, through a simple expedient, tap into an existing fluid supply system, so that the headlights of the automobile, or for that matter other motor vehicles with which the apparatus and system is used, may be cleaned in order to remove dirt, grime and other accumulated foreign matter, when the system is actuated, from the surface of a headlight to thereby increase the intensity of light emitted.

11 Claims, 9 Drawing Figures

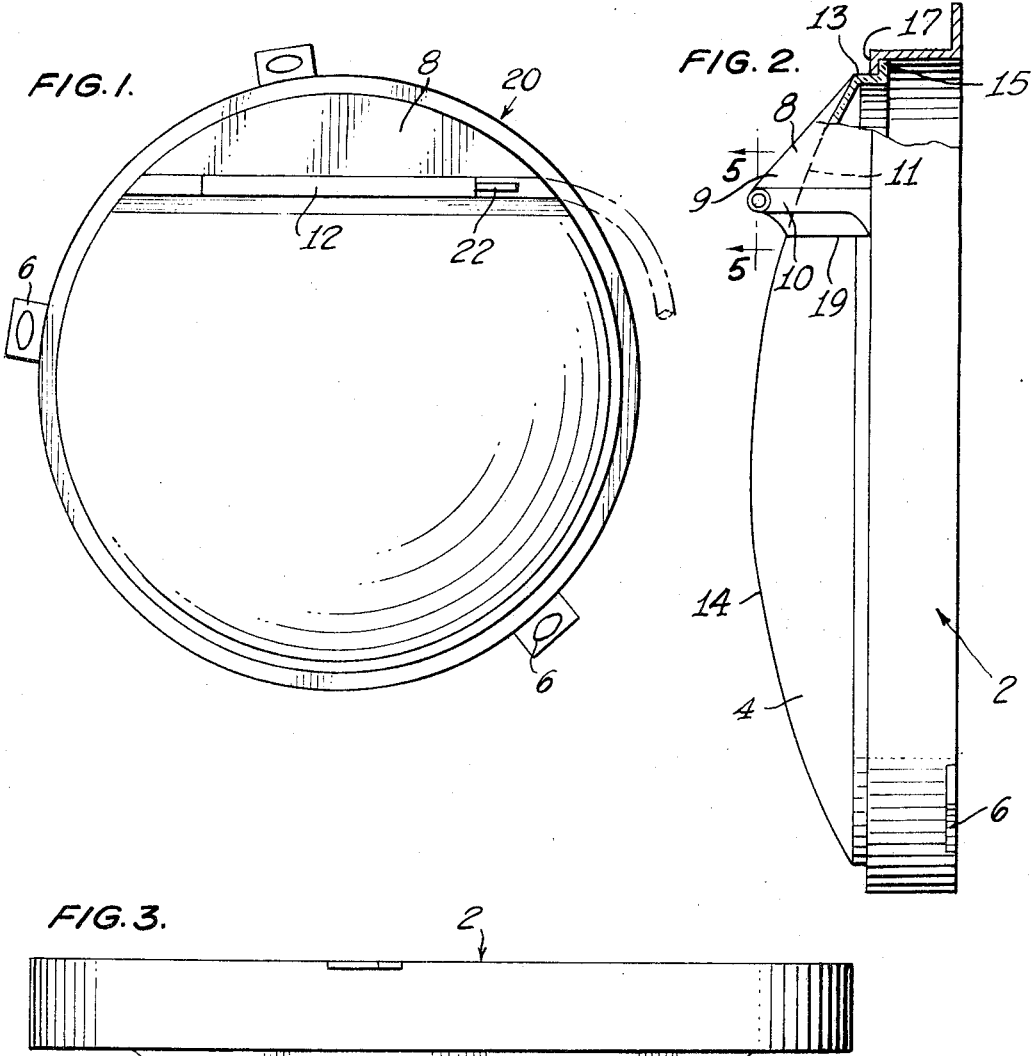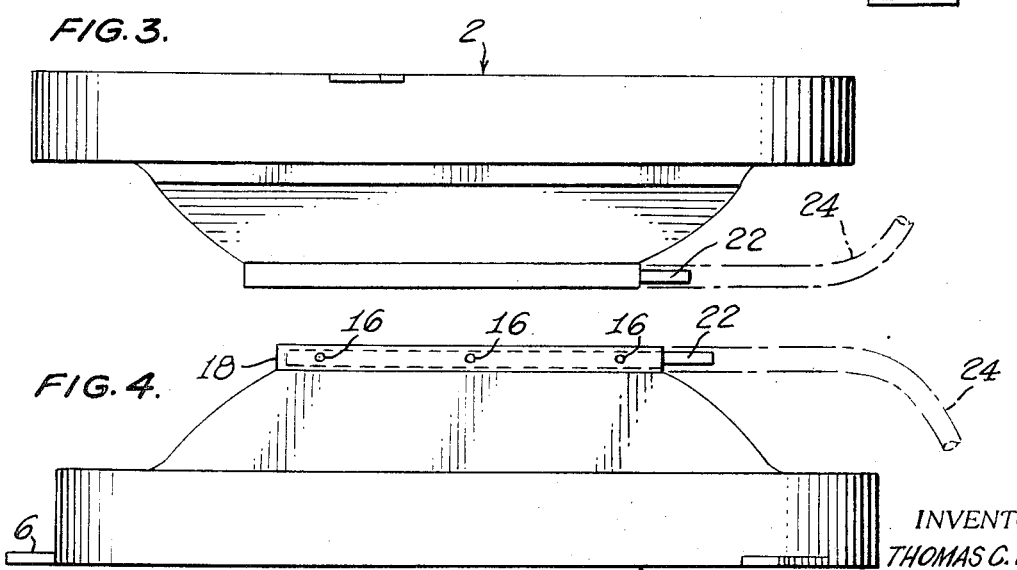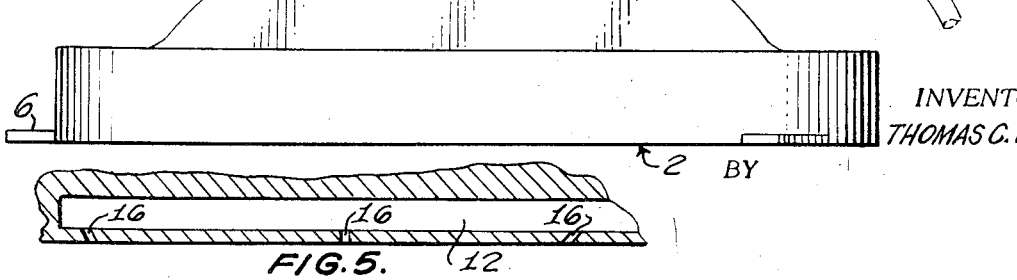

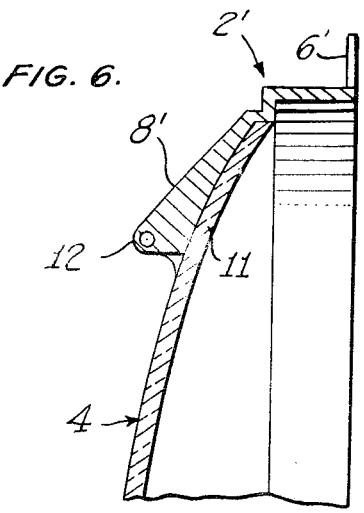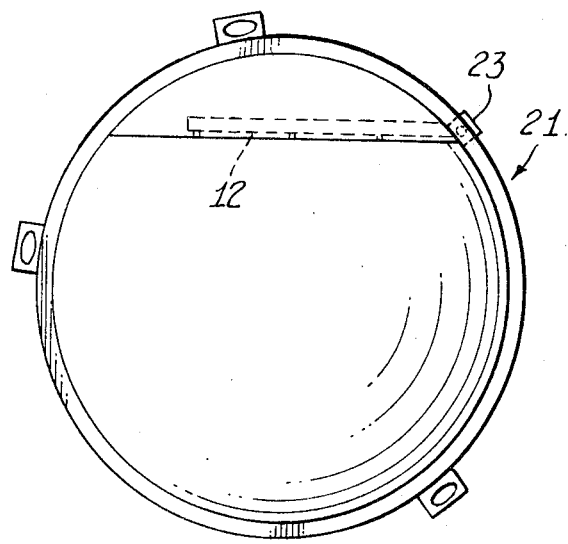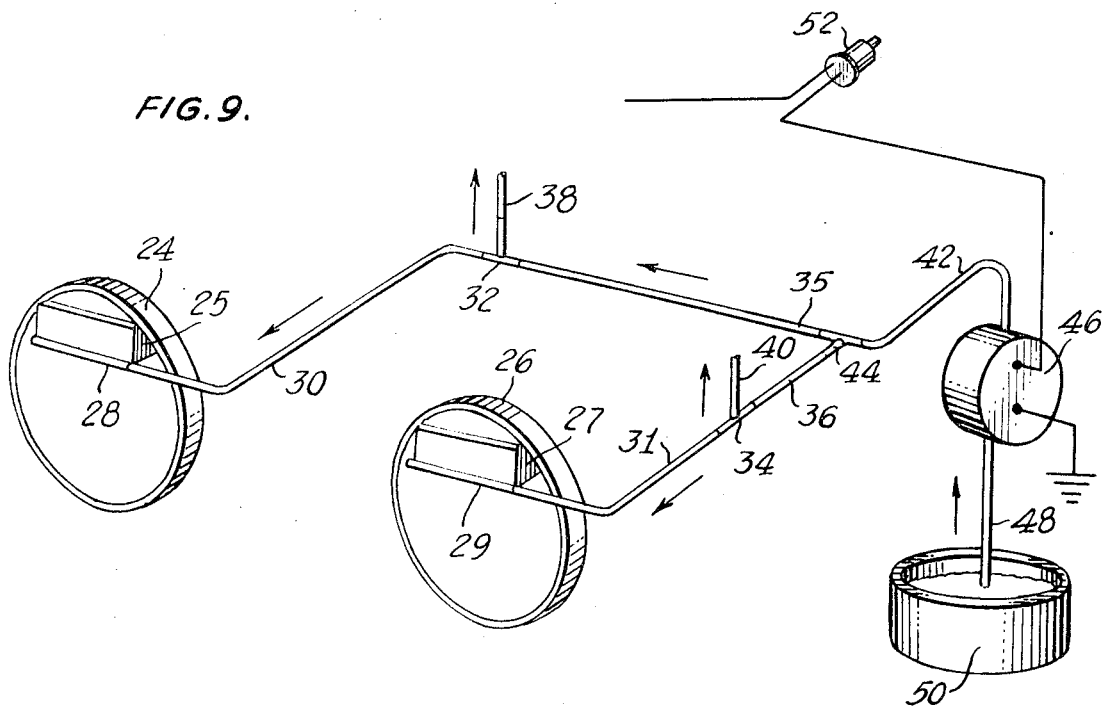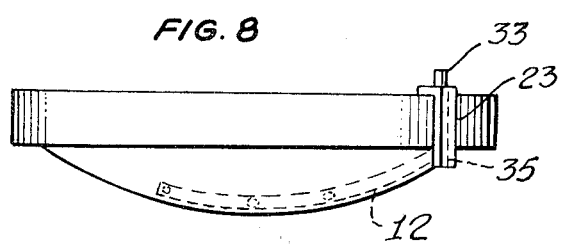
INVENTOR.
THOMAS C. WRIGHT

HEADLIGHT WASHER APPARATUS

BACKGROUND OF THE INVENTION

This invention has to do, in exemplary embodiment, with a headlight washer apparatus and system for use in conjunction with headlight assemblies of motor vehicles, and specifically automobiles employing, in the preferred form, a windshield washer system. The device in one form is intended to replace existing headlight rim members which are of a standard size and to be connected into an existing fluid supply system such as is found in conjunction with standard windshield washer assemblies. In other words, a single part having a specific configuration, replaces the fastening ring presently used, which holds the headlight in its socket. Another form of the device is used with existing ring assemblies and is held in place by the retaining ring found on the vehicle. This form merely involves loosening or removal of the retaining ring, placement of an insert, shield-like member onto the headlight lens and replacement of the ring to thereby lock same into place. By providing fluid communication to a windshield washer system, which incidentally is now required as a safety feature on all American-made vehicles, a means is provided for removing road soil from the headlight lens. The removal of the soil from the headlight lens is a safety feature in that, under some conditions, the limited visibility, in conjunction with specific driving conditions, as for instance night driving, could seriously impair the driver's vision. Because the lens cleaning system operates off of the existing windshield washer system and the design is such as to ensure deflection of air streams onto the headlight lens to aid in foreign matter removal, a low cost, easily installed, efficient headlight washer system is obtained. There is no need to wipe the lens completely free of droplets of cleaning fluid for in some cases the droplets cause a magnification effect which may be desirable under some circumstances. However, as indicated earlier, the directed passage of large volumes of air, at least when the motor vehicle is moving in a forward direction, will effect substantially removal of dirt and/or droplets from the lens.

SUMMARY OF THE INVENTION

Generally in an exemplary embodiment, the invention pertains to an automotive headlight washer apparatus for use with the headlight of a vehicle, comprising in combination, a washer member, adapted to fit over and encircle at least a portion of a headlight in a secured manner. The washer member has an upper shield-like depending portion projecting outwardly from the plane of the exterior surface of the headlight or lens, and is provided with a fluid passageway which has at least one aperture communicating the fluid passageway to the surface of the headlight or lens, and means to connect the fluid passageway to a fluid supply system. In one case the washer member is sued with an existing headlight ring and in another case a ring member is formed integrally with the washer member. In other embodiments of the invention, a system for cleansing the lens of a headlight as well as a modification kit fur use in conjunction with existing automobile headlight assemblages is also disclosed.

BRIEF DESCRIPTION OF THE DRAWINGS

FIG. 1 is a front view of one form of the washer member of this invention for use in conjunction with an existing headlight assembly;

FIG. 2 is a side view, partially broken away, of the member depicted in FIG. 1;

FIG. 3 is a top view of the member depicted in FIG. 1, with the headlight lens removed for clarity;

FIG. 4 is a bottom view of the member depicted in FIG. 3;

FIG. 5 is a partial, cross-sectional view taken along the lines 5—5 of FIG. 2;

FIG. 6 is a fragmentary view of the embodiment where the washer member is integrally formed with the ring member;

FIG. 7 is a front view of another embodiment of the invention;

FIG. 8 is a view taken along the lines 8—8 of FIG. 7; and

FIG. 9 schematically illustrates how the apparatus of this invention may be utilized in an existing fluid supply system.

DESCRIPTION OF THE PREFERRED EMBODIMENTS

Referring now to the drawings wherein like numerals of reference designate like elements throughout, and specifically referring to FIGS. 1 through 5, one embodiment of the headlight washer device is depicted as using existing retaining member 2 here, shown as being of annular configuration, of a standard size and presently used in most motor vehicles, for retaining headlight 4, within its socket or position. The shape or configuration may vary and may be round, square, rectangular of the like, depending upon the many automotive designs. Also, while the invention is described for a single type headlight, it may be practiced where double lights are used, either in vertical or horizontal alignment. Retaining member 2 has spaced projecting tabs 6 by which retaining ring 2 is adapted to be secured to the headlight socket (not shown) or the like by means of screws or bolts (not shown) in holes provided for that purpose. Washer member 8 is of shield-like configuration and has a projecting portion 9 which, in this particular case, in side elevation, is in the form of a truncated triangle with the base 10 having a fluid passageway 12 closed at one end but communicating to and overlying the external surface 14 of the headlight lens. It will be noted that interior surface 11 of washer member 8 is curvilinear and conforms to the configuration of the exterior of lens 4 so as to form a nestled fit. The apertures 16 in the base portion 10 of washer member 8 will, as will later become apparent, be able to provide fluid, such as washer solvent, to the exterior surface 14 of the lens 4 upon energization of the washer system. It is of course obvious, that the fluid passageway 12 is closed at the extreme end 18 while the opposite end 20 is provided with a tubular projecting portion 22 adapted to be connected to a length of standard, windshield washer-size hosing, for example 24 shown in phantom lines. Obviously, other means well known in the art and as later described may be used to make the fluid passageway connection to a fluid supply. Additionally, instead of spaced apertures 16 one nozzle-like orifice may be provided such that the spray of fluid is centralized on the lens.

The washer member 8, in this particular instance, for economic and other reasons, is preferably molded of plastic. Provision is made for insertion of a fluid passageway member or length of tubing. However, this too, if desired may be formed during the initial molding process. The alignment of the apertures 16, as can be seen from FIG. 5, are such as to direct several streams of washer solvent onto the exterior surface of the headlight lens. The apertures 16 at the two extreme ends of the fluid passageway 12 are askew with respect to the axis of the passageway 12, so as to provide slanting orifices to direct the majority of the fluid stream to the central portion of the headlight lens where the majority of the light rays are focused. While disclosed as being formed of plastic, the washer member 8 may be of any material of construction, and is contemplated that various metals be used where situations warrant. The modifications necessary to the formation of the apparatus and modifications to the system where metal is the material of construction and where different shapes of retaining members and where more than one headlight in a set are to be fitted, will at once present themselves to those of ordinary skill in the art, and such modifications will not detract from the spirit of the disclosed invention.

Washer member 8 is, as earlier indicated, of shield-like configuration having an interior curved surface 11 to fit closely on the exterior surface 14 of lens 4. The upper portion 13 of the member 8 is provided with offset lip 15 by which member 8 is held in snug relationship against the lens 4 by means of the depending flange 17 of retaining ring 2. To insert the washer member 8, one merely loosens the screws or bolts (not shown) holding the ring 2 at tabs 6 sufficiently to allow offset lip 15 to be slipped beneath flange 17. It should be noted that washer member 8 is provided with under surface 19 which diverges toward the exterior surface 14 of lens 4 to divert air, while the automobile or other vehicle to which the apparatuses of this invention are used, onto the surface of the lens to aid in the cleaning thereof.

Referring now to FIG. 6 another embodiment of the washer apparatus of this invention is depicted wherein the washer member 8' is integrally molded with the equivalent of the retaining member 2, in this instance 2', which is also equipped with integrally molded tabs, such as 6' by which this embodiment of the invention may be attached to the headlight socket. In this particular embodiment, the retaining ring member normally found in encircling relationship to the headlight is removed and discarded and the unitary and integrally molded or fabricated apparatus installed by placing the holding bolts or screws through the spaced tab portion 6'. The integral unit may be made of clear plastics or the like, preferably those having high strength and being of impact resistant character. As in the other non-unitary form i.e., where the washer element is separate and apart from the retaining ring structure, various metals of construction may also be used. It will be noted that the depending shield-like portion 8' of the unitary form is identical in construction to the washer member 8 previously described.

Referring now to FIGS. 7 and 8, still another embodiment of the invention is illustrated. In this particular instance, member 21 is also of integral form like the member depicted in FIG. 6 but instead of having a fluid connection for the orifices overlying the headlight lens positioned at the side, it is so constructed as to have an integrally molded orifice portion 23 which serves to communicate the bore 35 therethrough with the fluid passageway 12 and to a malleable extending fluid connector 33. Connector 33 may be of a soft, flexible plastic or an insertable, separate piece of malleable metal, such as copper, which may be easily twisted, turned and shaped in order to obtain proper connection of the fluid passageway 12 with a fluid resevoir system as will be apparent hereinafter. The bore 35 in orifice portion 23 is preferably made during the molding operation of the whole unit 21. The extending member 33 is a separate element that is insertable as by means of threading or frictionally fitting into the bore 35 in the element 23. In this particular embodiment, the hose connections from the windshield washer solvent system may be threaded or run through the headlight socket which does away with the necessity of running a fluid line through the radiator grillwork or the like. This particular feature, i.e., backwardly positioned or extending fluid passageway connector, may be, where desired, used in conjunction with any of the disclosed forms of the invention.

Referring now to FIG. 9, the mode in which the system and apparatus operates will be discussed. The retaining members 24 and 26 are of course schematically shown, and will be fashioned in both right-hand and left-hand forms for use in conjunction with both (or four) headlights of a motor vehicle. The upper projecting washer members 25 and 27 may be separate elements or integral with members 24 and 26 respectively, and are so positioned that they overlie the majority of the headlight lens which is encircled by the members 24 and 26. The headlight lenses for purposes of clarity are not illustrated. In the system of FIG. 7, it is contemplated that the type of windshield washer system normally found on cars produced and manufactured in the United States, (or for those foreign automobiles and other trucks equipped with such system) be used. In this instance, the fluid passageways 28 and 29 are provided with fluid connection means for connection to standard size rubber or plastic tubing used in such windshield washer systems. So as to be able to obtain the same or approximately the same pressures in each of the fluid passageways 28 and 29, separate hose connections 30 and 31 are provided communicating fluid passageways 28 and 29 respectively through, for instance, T-fittings, 32 and 34 which connect into the lengths of hose 35 and 36 coming from the main fluid reservoir of the fluid supply system. The hoses and fluid connectors 38 and 40 connect to the nozzles of the windshield washer system not shown. The fluid flow is in direction of the arrows. Hoses 35 and 36 communicate to the main fluid supply line 42 by means of I-connection 44 and hose 42, in turn, is connected to electrically operated fluid pump 46, which has an intake connection 48 terminating in a fluid reservoir such as 50, containing a washer solvent or the like.

In operation, when it is desired to operate the headlight washer system, one merely depresses the switch 52, which energizes the pump 46 and makes fluid in the reservoir 50 available through the conduits shown to the hose connections 38 and 40 communicating to the windshield washers and to the fluid passageways 28 and 29 disposed over the headlights. Because of the apertures, as earlier pointed out, communicating the fluid passageways 28 and 29 with the exterior surface of the headlight lens, the actuation of the windshield washer system not only cleans the windshield but also diverts fluid streams onto the headlight lens to clean same.

It is contemplated that the apparatuses of this invention, where the retainer members are internal, be manufactured in certain basic diameters and, of course, as earlier pointed out, they may be manufactured in both right- and left-hand forms. Generally, these different sizes will comprise two diameters for the reason that these are the sizes which are standard and most frequently encountered, so that existing automobiles, trucks or the like may be easily converted to those having headlight washer systems as described herein. The hoses contemplated may be of rubber, but in the preferred form are of plastic. Likewise, the T-fittings earlier referred to may also be of plastic, such that the existing fluid washer supply solvent system for existing windshield washer systems may be easily connected into by splicing and engagement of the hoses made by means of the plastic T effected by frictional interconnection or fit.

In most instances, the motor vehicle body will be provided with openings to the interior of the engine compartment and hence fluid supply system by means of spaced members used in the radiator grillwork, which may be of lattice configuration, such that connection between the fluid supply and washer members of this invention may be made. In other instances, a small hole or passageway may be made in the automobile body in proximity to the headlights by means of drilling or the like.

The apparatus and system described may be used in conjunction with most windshield washer systems, even those having a built-in cycling device which automatically stops the washing action after a predetermined amount of time. If after the passage of the predetermined amount of time, it is found that it is still necessary to divert more fluid to the headlights, the system may be reactuated and the cycle repeated as many times as desired. No matter what type of windshield washer system is found in the vehicle, the invention disclosed herein with little or no modification will be usable therewith.

Because it is desirable to have equal fluid volumes and pressures at the washing site, the fluid supply connections as depicted in FIG. 7 are preferred. While the invention has been described specifically as it might apply to automobiles or other motor vehicles having windshield washer systems, it is, of course, possible and within the contemplation of the use of the invention, that the headlight washer system have its own fluid supply source where desired. However, because of the economies involved, it is preferred to provide a kit-type of assemblage comprising washer members provided with fluid passageways therein, segments of hoses and T-fittings by which the existing washer supply system of an automotive vehicle may be used to also provide a washing system for the headlights of that vehicle.

A headlight washer system as heretofore described was fabricated and tested in order to ascertain its effectiveness. The headlight used was a type 4002 headlight operating at 13.5 volts on the low filament basis, which produced a little over 1,100 foot candles at its maximum output. This headlight was then purposely soiled with the type of dirt and grime normally encountered in road traffic, such that its total output was only 100 foot candles of light at a distance of 36 inches from the geometric center of the lens. It should be noted at this point that about 80 percent of light emission is from the geometric center of the lens. With a single actuation of the type of windshield washer system as illustrated in FIG. 7, the light level increased from 100 to 800 F.C. A second actuation of this system brought the lamp intensity to 975 F.C. where it remained during all additional actuation. In other words, after the first actuation the light efficiency level was increased from 9 percent of maximum output to 72 percent, whereas the second actuation brought the light output from 72 percent to a level of 87.5 percent of maximum. Thus, the efficacy of the invention in its intended use is manifest.

The embodiments in which an exclusive property or privilege is claimed are defined as follows:

1. A vehicle headlight washer apparatus for use with headlight means mounted to a vehicle by means of a retainer, the vehicle having a fluid supply system, comprising: a washer device adapted to fit over at least a portion of said headlight means in secured relationship, said washer device having an upstanding fastening member adapted to fit between said headlight means and the retainer and to be clamped in place therebetween to support said device therefrom, and having means defining a fluid passageway communicating with the fluid supply system, said passageway having at least one aperture communicating said passageway to the exterior surface of said headlight means.

2. An apparatus in accordance with claim 1, wherein said fastening member comprises a generally flat peripherally extending tab adapted to be positioned between the retainer and the exterior surface of said headlight means.

3. An automotive headlight washer apparatus for use with the headlight of a vehicle comprising in combination a washer member adapted to fit over and encircle at least a portion of said headlight in secured relationship, said washer member having an upper shield-like depending portion projecting outwardly from the plane of the exterior surface of said headlight and having a fluid passageway therein, said passageway having at least one aperture communicating said passageway to the exterior surface of said headlight and communicating to a fluid supply system, said passageway having an extending connection portion adapted to be connected to the windshield washer system of an automotive vehicle, and a ring retaining member adapted to fit over and retain said washer member in secured relationship.

4. An apparatus in accordance with claim 3, wherein said ring retaining member and said washer member are integrally formed by molded, high-strength plastic and said fluid passageway is formed in the molding process.

5. An apparatus in accordance with claim 4, wherein extending tab-like fastening projections are formed on the outer periphery of said retaining member for securement to the headlight socket of said headlight.

6. An apparatus in accordance with claim 5, wherein each headlight is provided with said apparatus and said vehicle body in proximity to each of said headlights is provided with a communication so that each fluid passageway may be independently connected into said windshield washer system.

7. An apparatus in accordance with claim 6, wherein said fluid passageway is provided with a centralized nozzle-like orifice which is adapted to effect centralization of fluid being emitted therefrom.

8. An apparatus in accordance with claim 7, wherein said ring retaining member has a peripheral rim portion sufficient in width encircle the headlight assemblage of a motor vehicle.

9. An automotive headlight washer apparatus for use with the headlight of a vehicle comprising in combination a washer member adapted to fit over and encircle at least a portion of said headlight in secure relationship, said washer member having an upper shield-like depending portion projecting outwardly from the plane of the exterior surface of said headlight and having a fluid passageway therein, said passageway having at least one aperture communicating said passageway to the exterior surface of said headlight and communicating to a fluid supply system, the interior surface of said shield-like depending portion of said washer member being of a congruent configuration as the lens of said headlight, such that said washer member snugly engages at least a portion of the exterior surface of said lens.

10. An apparatus in accordance with claim 9, wherein said fluid passageway has a terminal extending portion adapted to be engaged by a fluid carrying conduit.

11. The apparatus in accordance with claim 10, wherein a diverging surface towards the exterior surface of said lens is formed on the underside of said shield-like depending portion to channel air towards said lens exterior surface.

* * * * *